Figure 1:
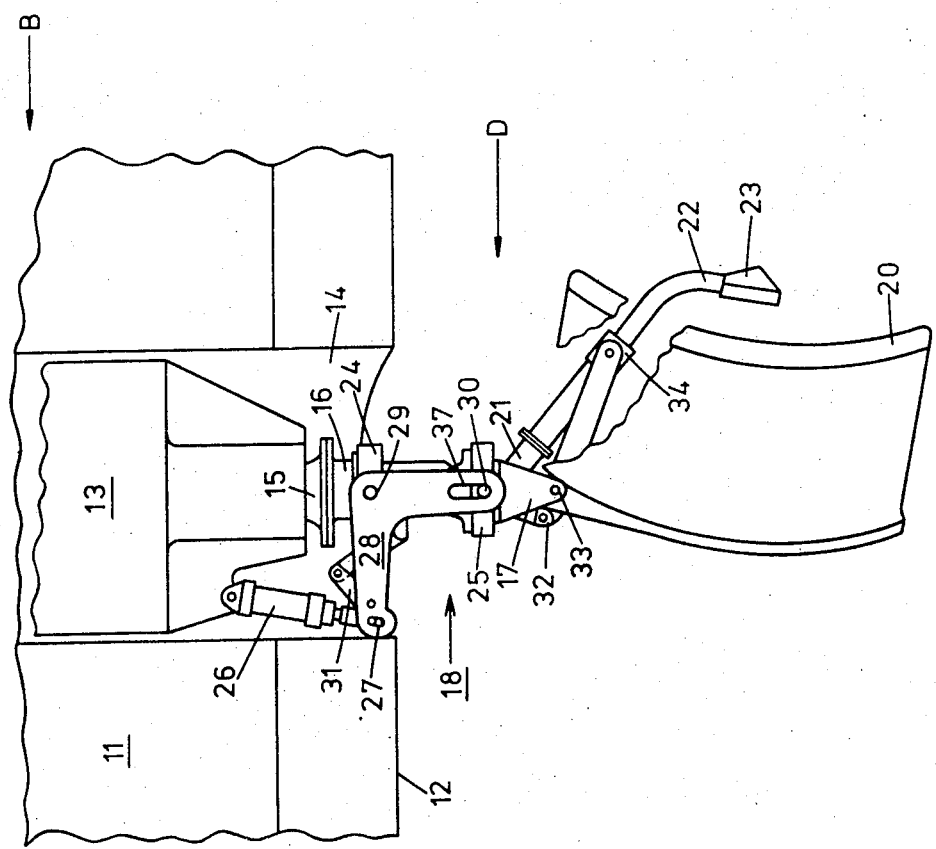

United States Patent [19]
Reid

[11] 3,803,614
[45] Apr. 9, 1974

[54] HELICOPTER CARRIED SCANNING ANTENNA

[75] Inventor: Peter Reid, Hardington Mandeville, near Yeovil, England

[73] Assignee: Westland Aircraft Limited, Yeovil, Somerset, England

[22] Filed: June 29, 1972

[21] Appl. No.: 267,543

[30] Foreign Application Priority Data
July 7, 1971   Great Britain.................. 31951/71

[52] U.S. Cl................ 343/705, 343/765, 244/17.11
[51] Int. Cl. ........................................... H01q 1/28
[58] Field of Search .......... 343/705, 708, 766, 765; 244/17.11

[56] References Cited
UNITED STATES PATENTS

| | | | |
|---|---|---|---|
| 3,412,404 | 11/1968 | Bergling............................. | 343/765 |
| 3,656,164 | 4/1972 | Rempt ................................ | 343/705 |
| 2,984,834 | 5/1961 | Howard ............................. | 343/705 |
| 2,702,346 | 2/1955 | Evans et al. ........................ | 343/705 |
| 3,646,564 | 2/1972 | Drislane............................. | 343/766 |

*Primary Examiner*—Eli Lieberman
*Attorney, Agent, or Firm*—Larson, Taylor & Hinds

[57] ABSTRACT

A helicopter is provided with a scanning device mounted beneath a lower surface of a fuselage for movement between an extended operational position and a retracted non-operational position adjacent the lower surface, and for continuous rotation about a generally vertical axis when in its extended position.

15 Claims, 4 Drawing Figures

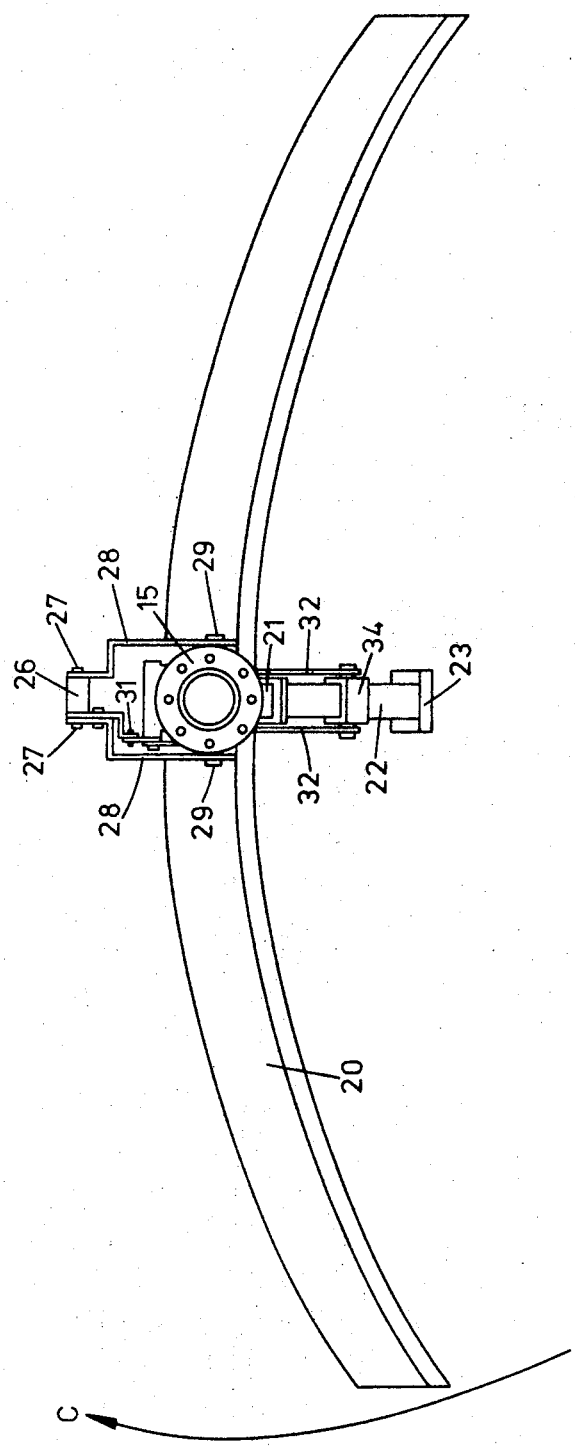

HELICOPTER CARRIED SCANNING ANTENNA

This invention relates to helicopters, and more particularly to helicopters fitted with a scanning device.

Prior attempts at mounting a scanning device on a helicopter have been restricted, by stability and drag problems, to the fitment of devices having a relatively small surface area, resulting in poor range capabilities and inferior definition. It is known that these features improve in relation to increase in the physical size of the scanning device.

For stability reasons it is desirable to mount a scanning device on the vertical centerline either above or below the helicopter fuselage. In installations above the fuselage, the size is limited by the space available beneath the rotor blades and is in any case not preferred because of interference difficulties emanating from the rotating machinery. In installations below the fuselage the size is limited by the space available when the helicopter is resting on its undercarriage, which, because of ground stability problems, is preferably as short as possible. Attempts to overcome this problem, and also to reduce drag during normal cruise flight conditions, have resulted in proposals to retract the scanning device into the fuselage in a non-operational position; however, this also imposes size limitations due to structural integrity problems and the restricted space available, especially in view of the necessary ancillary role equipment which has also to be carried.

According to the invention, I provide a helicopter having a scanning device located beneath a lower surface of a fuselage, including an operating mechanism for moving the scanning device between a retracted non-operational position in which the scanning device is located transverse of the fuselage and symmetrical about a vertical plane through the longitudinal centerline of the fuselage and an extended operational position, and permitting continuous rotation of the scanning device about a generally vertical axis coincident with the vertical plane through the longitudinal centerline of the fuselage when in its extended position, the operating mechanism being arranged so that in its retracted non-operational position the scanning device is located adjacent the lower surface of the fuselage aft of the operating mechanism and with its scanning surface uppermost.

Figure 2:
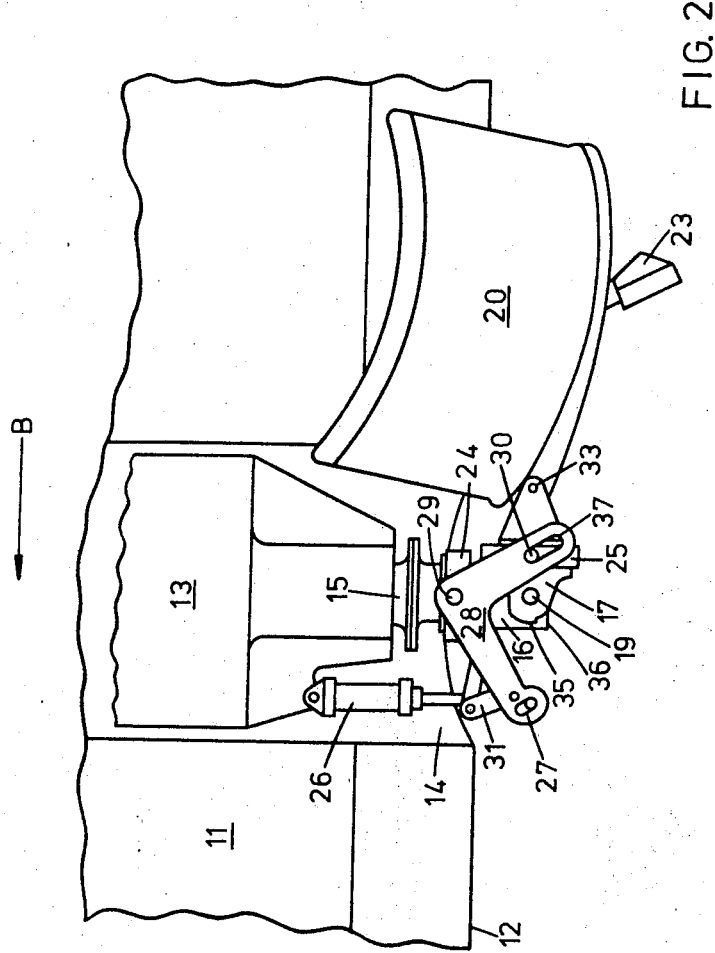
Figure 3:
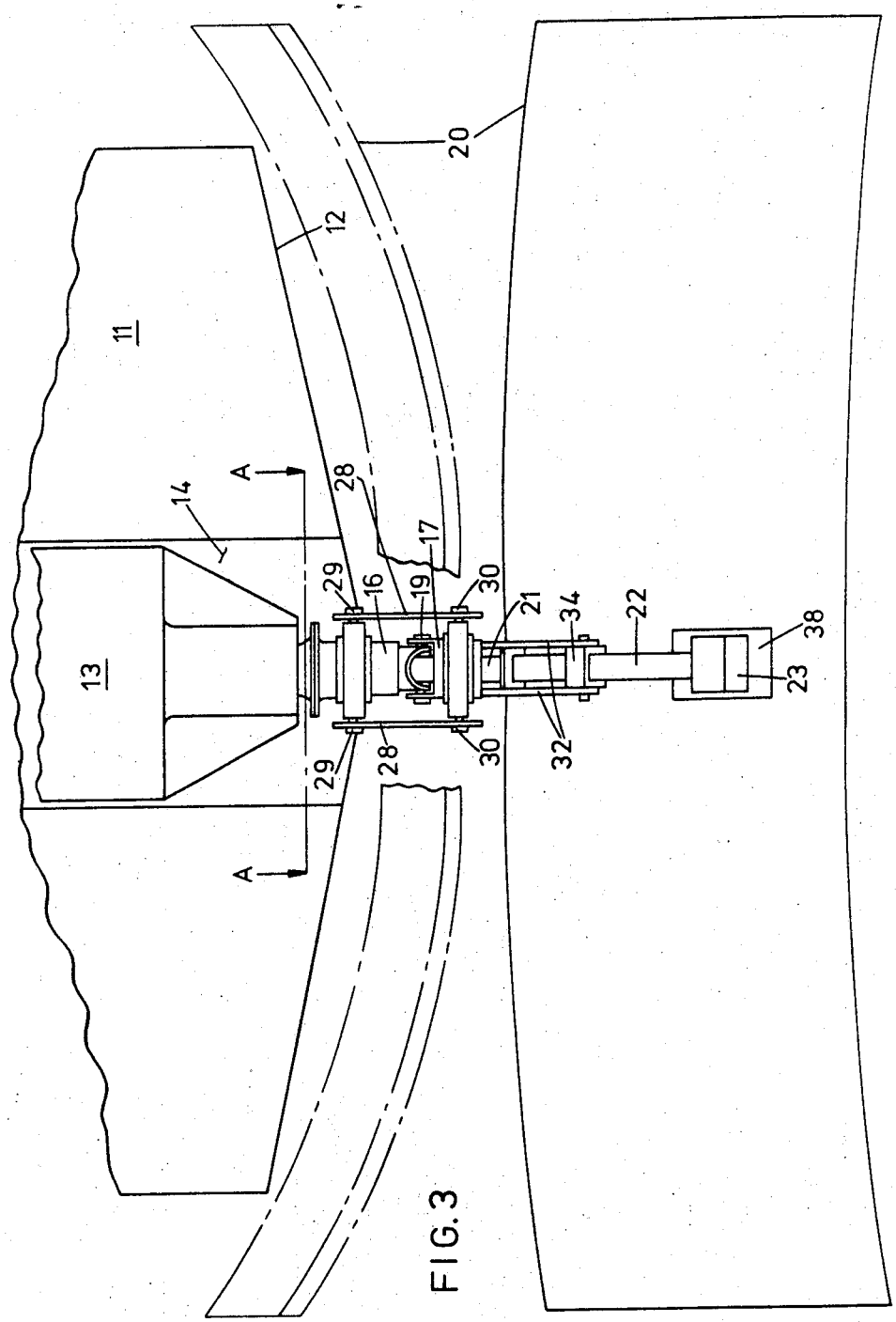

The invention will now be described by way of example only and with reference to the accompanying drawings in which:

FIG. 1 is a side elevation of a helicopter having a scanning device mounted beneath a fuselage, showing the scanning device in an extended operational position, FIG. 2 is a view similar to FIG. 1, but showing the scanning device in a retracted non-operational position, FIG. 3 is an end view in the direction of arrow D on FIG. 1, and FIG. 4 is a plan view taken on lines A-A of FIG. 3, with the direction of rotation of the scanning device indicated by arrows C.

Referring now to FIGS. 1 and 2, helicopter capable of forward flight in the direction of arrow B includes a fuselage 11 having a lower surface 12. A transmitter/receiver unit 13 is mounted in the fuselage 11 above an aperture 14 in the lower surface 12, and includes a motor (not shown) arranged to rotate a flanged output shaft 15 about a substantially vertical axis coincident with a vertical plane through the longitudinal centreline of the fuselage 11 (FIG. 3).

An upper end 16 and lower end 17 of a drive shaft are located in an operating mechanism generally indicated at 18 and hereinafter more fully explained. The upper end 16 and lower end 17 are connected through a pivotal joint 19 (FIGS. 2 and 3), the upper end 16 being connected to the output shaft 15 and the lower end 17 being adapted to support a scanning device in the form of an antenna 20. The shaft 15 and upper and lower ends 16 and 17 of the drive shaft are hollow so that operating signals to and from the transmitter/receiver unit 13 can pass through a flexible wave guide 21 and a rigid wave guide 22 to a feeder horn 23 located as shown in the drawings relative to the surface of the antenna 20.

The upper end 16 and lower end 17 of the drive shaft are supported by bearings located in upper and lower stationary bearing housings 24 and 25 respectively.

An actuating jack 26 is connected between the casing of the transmitter/receiver unit 13 and pivotal slotted connections 27 on upper arms of two spaced substantially right angle levers 28 pivotally mounted at 29 on diametrically opposed sides of the upper bearing housing 24 in a vertical plane normal to the vertical plane through the longitudinal centerline of the fuselage. The lower arms of the levers 28 are pivotally connected to pins 30 mounted on diametrically opposed sides of the lower bearing housing 25, and located in slots 37 in the levers 28. The slots 37 extend in a direction parallel to a line drawn between the pivotal mounts on the upper and lower bearing housings 24 and 25 respectively.

A link mechanism 31 is fitted at the pivotal slotted connections 27 and connected with a locking mechanism comprising a pivotally mounted latch (not shown) adapted to engage a lip 35 (FIG. 2), formed on an upper surface of the lower end 17, when the antenna 20 is in the extended position shown in FIG. 1. A further link mechanism 32 is connected between the pivotal joint 19, a pivotal connection 33 on the lower end 17 of the drive shaft and a sleeve 34 slidably mounted over the rigid wave guide 22.

When the antenna 20 is in its extended operational position (FIG. 1), the link mechanism 31 holds the latch of the locking mechanism in engagement with the lip 35 to prevent swinging of the antenna 20 in one direction. Swinging in the other direction is prevented by a surface 36 (FIG. 2) on the upper end 16 abutting a surface on the lower end 17. The antenna 20 is continuously rotated by the motor in the transmitter/receiver unit 13 through the upper and lower ends 16 and 17 of the drive shaft rotating in the bearings in the bearing housings 24 and 25 respectively. Rotation of the antenna 20 is effective about a substantially vertical axis which lies in a vertical plane through the longitudinal centreline of the fuselage 11.

When it is desired to retract the antenna 20, the motor is the transmitter/receiver unit 13 is stopped, so that the antenna 20 is facing rearwardly and lies transversely with respect to the fuselage 11 and symmetrically about a vertical plane through the longitudinal centreline of the fuselage, as shown in the drawings.

Initial extension of the jack operates in the overtravel provided by the slotted connections 27 to pivot the link mechanism 31 and release the locking mechanism securing the antenna 20 in the extended position, as previously described. Further extension of the jack pivots the upper arms of the lever 28 about the pivotal mounts 29, causing the lower arms of the lever 28 to pivot the lower end 17 of the drive shaft together with the antenna 20 about the pivotal joint 19 (FIGS. 2 and 3).

As the joint 19 is located intermediate the pivotal mounts 29 and pins 30, angular movement of the lower end 17 is accelerated over angular movement of the lever 28, this being facilitated by the pins 30 moving to the opposite end of the slots 37 in the lower arms of the lever 28. This is clear from a comparison of FIGS. 1 and 2, in which the lower end 17 can be seen to have moved through approximately 90° to the retracted position for a corresponding movement of the levers 28 in the order of 40°.

Movement of the lower end 17 is transmitted to the rigid wave guide 22 through the link mechanism 32, the pivotal connection 33, and the sleeve 34, this movement being facilitated by bending of the flexible wave guide 21. The link mechanism 32 is arranged so that the rigid wave guide 22 moves through a smaller arc than the lower end 17, so that in the retracted position the feeder horn 23 protrudes through an aperture 38 (FIG. 3) in the surface of the antenna 20. Again, this is clear from FIGS. 1 and 2, in which the lower end 17 can be seen to have moved through approximately 90° to the retracted position, causing a corresponding movement of the rigid wave guide 22 of approximately 35°. This arrangement means that the antenna 20 can be retracted to a non-operational position transverse of the fuselage 11 and symmetrical about a vertical plane through the longitudinal centreline so that the surface of the antenna 20 is adjacent the lower surface 12, this being further facilitated by the generally convex shape of the lower surface 12 being complementary in this respect to the concave surface of the antenna 20, as best shown in FIG. 3, in which the broken line indicates the antenna 20 in its retracted position.

Extension of the antenna 20 from the retracted position shown in FIG. 2 is accomplished by retraction of the jack 26. The link mechanism 32 ensures that the feeder horn 23 is correctly located relative to the surface of the antenna 20, and the link mechanism 31 and the overtravel in the slotted connections 27 is effective to operate the locking mechanism to lock the antenna 20 in the extended operational position (FIG. 1).

The present invention provides important advantages in the mounting of a rotatable antenna on a helicopter, in that it provides for mounting an antenna of a size previously not possible, yet which incurs a minimum drag penalty, requires a minimum height undercarriage, and minimises flight control and stability problems. The invention is not limited to any particular size antenna, and, although the accompanying drawings are representative of an 8 ft. × 2 ft. size, many other sizes can be fitted, for instance, a 9 ft. × 3 ft. or an 8 ft. × 6 ft. Antennae having other surface shapes can be used in place of the one shown in the drawings, for instance, a circular or parabola shaped antenna could be incorporated with the same advantages.

The arrangement of the present invention enables the antenna 20 to be located close to the transmitter/receiver unit 13, which is desirable because of significant benefits to the operating characteristics of the equipment, due to the shorter length of the wave guide. Preferably the transmitter/receiver unit 13 is mounted as close as possible to the centre of gravity of the helicopter.

The invention, therefore, enables a large antenna to be mounted beneath a helicopter and moved between an extended operational position and a retracted non-operational position adjacent the fuselage, in which retracted position the area of the device presented in the direction corresponding to the normal flight direction is considerably reduced, thereby effectively reducing the drag penalty of such an installation. Due to its small space requirement in the retracted position an unmodified undercarriage can generally be retained as opposed to a lengthened undercarriage which would otherwise be necessary to accommodate the height of the antenna 20, thus incurring weight and structural problems, limiting the size of the antenna 20 and increasing the possibility of ground resonance occurring during ground running of the helicopter. A further feature results from the retracted position of the antenna 20 in which the antenna is arranged transverse of the fuselage 11 and symmetrical about a vertical plane through the longitudinal centreline of the fuselage, so that any loads are equalised, thereby minimising any possible flight control and stability problems.

The operating mechanism 18 hereinbefore described is shown as one example only of a suitable means of putting the present invention into effect, which achieves the above advantages. One important feature of the mechanism is that by accelerating movement of the lower end 17 over movement of the levers 28, the stroke of the jack 26 is significantly reduced, thereby facilitating the fitment of a smaller and lighter unit. Another feature concerns the link mechanism 32 which ensures that the feeder horn 23 is correctly positioned relative the antenna 20 in its extended position, and is retracted through a smaller arc than the antenna to enable the antenna to be fully retracted without the feeder horn 23 encroaching into the fuselage 11. Alternatively, a configuration can be incorporated in which the feeder horn is fixed relative the surface of the antenna in a position corresponding approximately with the retracted position, shown in FIG. 2, so that the link mechanism 32 can be dispensed with. In such an alternative configuration it is possible to arrange the feeder horn 23 so that it is not necessary to make provision for its protrusion through the surface of the antenna 20 when in the retracted position as in the embodiment hereinbefore described and illustrated.

Although one embodiment of the invention has been described and illustrated it is to be understood that modifications can be made without departing from the scope of the appended claims. For instance, the transmitter/receiver unit 13 could be made vertically movable to enable the antenna 20 to be lowered further from the fuselage in the operating position. The integral transmitter/receiver and motor unit may be replaced by separate units. Anti-drag fairings may be fitted on the lower surface 12 to further reduce drag in the retracted position. The actuating jack 26 may be either hydraulically or pneumatically operated, or alternatively some other suitable form of power source such as a screw jack and motorised nut could be used. Locking means can be provided to lock the antenna in the retracted position and a sequence mechanism could be employed to ensure that the antenna 20 always comes to rest in the transverse position, as shown in the drawings. As a safety feature a control can be provided to prevent the jack or other power soruce from operating if for any reason the antenna comes to rest at any other position, and manual means could be incorporated for rotating the antenna to the correct position.

I claim as my invention:

1. A helicopter having a scanning device located beneath a lower surface of a fuselage, including an operating mechanism for moving the scanning device between a retracted non-operational position in which the scanning device is located transverse of the fuselage and symmetrical about a vertical plane through the longitudinal centerline of the fuselage and an extended operational position, and permitting continuous rotation of the scanning device about a generally vertical axis coincident with the vertical plane through the longitudinal centerline of the fuselage when in its extended position, the operating mechanism being arranged so that in its retracted non-operational position the scanning device is located adjacent the lower surface of the fuselage aft of the operating mechanism and with its scanning surface uppermost.

2. A helicopter as claimed in claim 1, wherein means are provided so that when rotation is stopped the scanning device is automatically positioned transverse of the fuselage and with its scanning surface facing rearwardly.

3. A helicopter as claimed in claim 1, wherein the operating mechanism is connected to a transmitter/receiver unit supported within the fuselage above an aperture in the lower surface thereof.

4. A helicopter as claimed in claim 3, wherein a motor is fitted integral with the transmitter/receiver unit to continuously rotate a shaft protruding from the lower end of the unit when the scanning device is in its extended operational position.

5. A helicopter as claimed in claim 4, wherein the operating mechanism includes a drive shaft having an upper end and a lower end rotatably mounted in the upper and lower bearing housings and pivotally connected between the housings, the upper end being adapted for connection to the shaft protruding from the transmitter/receiver unit, and the lower end being adapted to support the scanning device.

6. A helicopter as claimed in claim 5, wherein two levers are pivotally mounted on the upper bearing housing at diametrically opposed locations in a vertical plane normal to the vertical plane through the longitudinal centreline of the fuselage, each lever having two arms extending at substantially 90° from the pivotal mount on the upper bearing housing, one pair of arms being pivotally connected at diametrically opposed locations to the lower bearing housing, the other pair of arms extending forwardly from the pivotal mount on the upper bearing housing for pivotal connection at their extremities to one end of an actuating jack.

7. A helicopter as claimed in claim 6, wherein the other end of the actuating jack is connected to the casing of the transmitter/receiver unit.

8. A helicopter as claimed in claim 6, wherein the pivotal connections to the lower bearing housing comprise pins fitted in the housing and located in slots in the arms, the slot in each arm extending in a direction parallel to a line drawn between the pivotal mounts on the upper and lower bearing housings.

9. A helicopter as claimed in claim 6, wherein locking means are provided and adapted to lock the scanning device in its extended operational position against swinging about the pivotal connection of the upper and lower ends between the upper and lower bearing housings.

10. A helicopter as claimed in claim 9, wherein the locking means is automatically operated by movement of the actuating jack.

11. A helicopter as claimed in claim 10, wherein the locking means includes a link mechanism operated by overtravel of the actuating jack in slotted connections at the extremities of the forwardly extending arms of the levers, actuation of the link mechanism being effective to operate a latch into and out of engagement with a lip formed on an upper surface of the lower end of the drive shaft, depending on the direction of movement of the jack.

12. A helicopter as claimed in claim 5, wherein the shaft protruding from the transmitter/receiver unit and the upper and lower ends of the drive shaft are hollow and adapted to house one end of a wave guide extending between the transmitter/receiver unit and a feeder horn supported in an operational position relative the surface of the scanning device when the scanning device is in its extended operational position.

13. A helicopter as claimed in claim 12, wherein at least that part of the wave guide which is housed in the lower end of the drive shaft is flexible.

14. A helicopter as claimed in claim 13, wherein support means for the feeder horn includes a link mechanism pivotally connected to a sleeve slidably mounted on the wave guide at the end adjacent the feeder horn, the link mechanism being arranged so that, during movement of the scanning device through an arc from its extended position to its retracted position, the feeder horn is moved through a smaller arc to lie adjacent the surface of the scanning device when in its retracted position.

15. A helicopter as claimed in claim 1, wherein the lower surface of the fuselage is shaped to conform with the shape of the surface of the scanning device when in its retracted non-operational position.

* * * * *